(12) United States Patent
Gunaratnage et al.

(10) Patent No.: US 12,282,650 B2
(45) Date of Patent: Apr. 22, 2025

(54) HYPERCONTEXTUAL TOUCH-THE-PLANE (TTP) CABIN MANAGEMENT GRAPHICAL USER INTERFACE (GUI)

(71) Applicant: Rockwell Collins, Inc., Cedar Rapids, IA (US)

(72) Inventors: Rojith P. Gunaratnage, Cedar Rapids, IA (US); Levi D. Van Oort, Clarence, IA (US); Maureen A. Veith, Marion, IA (US); Christopher P. Gehrke, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 414 days.

(21) Appl. No.: 16/657,231

(22) Filed: Oct. 18, 2019

(65) Prior Publication Data
US 2021/0362874 A1 Nov. 25, 2021

(51) Int. Cl.
*G06F 3/04847* (2022.01)
*B64D 11/00* (2006.01)
(Continued)

(52) U.S. Cl.
CPC ...... *G06F 3/04847* (2013.01); *B64D 11/0015* (2013.01); *B64D 11/00155* (2014.12); *G06F 3/04815* (2013.01); *G06F 3/0482* (2013.01)

(58) Field of Classification Search
CPC .............. G06F 3/04815; G06F 3/0482; G06F 3/04817; G06F 3/0484–04847;
(Continued)

(56) References Cited

U.S. PATENT DOCUMENTS

| 6,988,246 B2 * | 1/2006 | Kopitzke | B64D 11/00 700/277 |
| 7,506,272 B2 * | 3/2009 | Kopitzke | B64D 11/00 700/277 |

(Continued)

FOREIGN PATENT DOCUMENTS

| AU | 2010257154 B2 | 12/2010 | |
| CA | 3005946 A1 * | 6/2017 | B64D 11/00 |

(Continued)

OTHER PUBLICATIONS

Search Report for European Application No. 20202629.0 dated Mar. 9, 2021, 8 pages.

*Primary Examiner* — Benjamin Smith
(74) *Attorney, Agent, or Firm* — Suiter Swantz IP

(57) ABSTRACT

A cabin management control device is disclosed. In embodiments, the cabin management control device includes a touchscreen (e.g., either a fixed panel or a mobile computing device) and processors. The computing device is in communication with aircraft-based networks or controllers configured for control of cabin features or functions. The computing device displays, via the touchscreen, an interactive graphical user interface (GUI) in the form of a high resolution "virtual cabin", e.g., a graphical representation of the aircraft cabin or a zone thereof. The GUI incorporates active touch areas (ATA) corresponding to visible cabin features (e.g., lighting, windows, inflight entertainment systems (IFE)). Similarly, the GUI displays direct access controls (DAC) allowing for similar control of non-visible cabin features (e.g., volume settings, climate settings), When an ATA or DAC is selected, the GUI displays a textless control interface enabling the user to control the corresponding feature via an optimally intuitive interface.

13 Claims, 7 Drawing Sheets

(51) Int. Cl.
*G06F 3/04815* (2022.01)
*G06F 3/0482* (2013.01)

(58) Field of Classification Search
CPC . B64D 11/00; B64D 11/0007; B64D 11/0015; B64D 11/00155; B64D 2011/0038; B64D 11/04; B64D 2011/0061; B60K 2370/171
See application file for complete search history.

(56) References Cited

U.S. PATENT DOCUMENTS

| | | | | |
|---|---|---|---|---|
| 7,509,587 | B2* | 3/2009 | Kopitzke | B64D 11/00 |
| | | | | 700/277 |
| D607,801 | S* | 1/2010 | Canal | D12/345 |
| 8,095,278 | B2* | 1/2012 | Schaaf | B60N 2/0228 |
| | | | | 715/810 |
| 8,547,340 | B2* | 10/2013 | Sizelove | A63F 13/98 |
| | | | | 345/173 |
| 9,205,914 | B1 | 12/2015 | Fagan et al. | |
| 9,292,180 | B2* | 3/2016 | Gass | G06Q 50/04 |
| 9,481,463 | B2* | 11/2016 | Riedel | B64D 11/0015 |
| 9,550,419 | B2* | 1/2017 | Habashima | G06F 3/0482 |
| 9,558,715 | B2* | 1/2017 | Velten | G06F 3/16 |
| 9,650,141 | B2* | 5/2017 | Fagan | B64D 11/0015 |
| 9,669,931 | B2* | 6/2017 | Graumann | G06F 9/451 |
| 9,703,476 | B1* | 7/2017 | Pappas | G06F 3/04847 |
| 9,772,712 | B2* | 9/2017 | Kneuper | G08G 5/025 |
| 9,849,988 | B2* | 12/2017 | Carles | B64D 11/0626 |
| 9,873,509 | B2* | 1/2018 | Gagnon | A62B 99/00 |
| 9,965,931 | B2* | 5/2018 | Reinbold | B64D 11/06 |
| 10,042,456 | B2* | 8/2018 | Kneuper | G01C 23/00 |
| 10,222,766 | B2 | 3/2019 | Fagan et al. | |
| 10,318,057 | B2* | 6/2019 | Kneuper | G08G 5/0021 |
| 10,684,739 | B2* | 6/2020 | Baron | G09B 9/165 |
| 11,021,269 | B2* | 6/2021 | Fagan | B64D 11/00155 |
| 11,305,886 | B1* | 4/2022 | Gilbert | B64D 43/00 |
| 2002/0015063 | A1* | 2/2002 | Kopitzke | B64D 11/00 |
| | | | | 715/810 |
| 2008/0040693 | A1* | 2/2008 | Toyama | G06Q 10/06311 |
| | | | | 715/865 |
| 2008/0071398 | A1 | 3/2008 | Kneller et al. | |
| 2009/0079705 | A1* | 3/2009 | Sizelove | A63F 13/40 |
| | | | | 244/129.1 |
| 2009/0112377 | A1 | 4/2009 | Schalla et al. | |
| 2010/0176632 | A1* | 7/2010 | Alford | B60N 2/0233 |
| | | | | 297/217.3 |
| 2010/0217458 | A1* | 8/2010 | Schweiger | G06F 16/29 |
| | | | | 715/728 |
| 2010/0318266 | A1* | 12/2010 | Schaaf | B60N 2/0233 |
| | | | | 701/49 |
| 2011/0004832 | A1* | 1/2011 | Canal | G06Q 30/06 |
| | | | | 715/764 |
| 2011/0282537 | A1* | 11/2011 | Yamasaki | G06F 3/0346 |
| | | | | 701/31.4 |
| 2012/0089948 | A1* | 4/2012 | Lim | G06F 3/017 |
| | | | | 715/846 |
| 2014/0085337 | A1* | 3/2014 | Velten | G09G 5/14 |
| | | | | 345/635 |
| 2014/0298227 | A1* | 10/2014 | Gass | G06Q 50/04 |
| | | | | 715/771 |
| 2015/0040066 | A1* | 2/2015 | Baron | G09B 9/165 |
| | | | | 715/810 |
| 2015/0058777 | A1* | 2/2015 | Graumann | G06F 3/04847 |
| | | | | 715/771 |
| 2015/0094882 | A1* | 4/2015 | Riedel | B64D 11/0015 |
| | | | | 701/3 |
| 2015/0202962 | A1* | 7/2015 | Habashima | G06T 19/006 |
| | | | | 345/633 |
| 2015/0239561 | A1* | 8/2015 | Hau | G06F 3/04847 |
| | | | | 715/771 |
| 2015/0261379 | A1* | 9/2015 | Kneuper | G06F 3/04883 |
| | | | | 345/173 |
| 2016/0004374 | A1* | 1/2016 | Kneuper | G01C 23/00 |
| | | | | 345/173 |
| 2016/0059953 | A1* | 3/2016 | Fagan | B64D 11/0015 |
| | | | | 701/3 |
| 2016/0059954 | A1 | 3/2016 | Fagan et al. | |
| 2016/0062327 | A1 | 3/2016 | Fagan et al. | |
| 2016/0062618 | A1* | 3/2016 | Fagan | G06F 3/0488 |
| | | | | 715/772 |
| 2016/0114890 | A1* | 4/2016 | Gagnon | G06F 3/0416 |
| | | | | 345/173 |
| 2016/0304207 | A1* | 10/2016 | Carles | G08C 17/02 |
| 2017/0064067 | A1 | 3/2017 | Hockenberry et al. | |
| 2017/0344181 | A1* | 11/2017 | Kneuper | G08G 5/0021 |
| 2018/0075717 | A1* | 3/2018 | Reinbold | H04N 21/41265 |
| 2018/0232097 | A1* | 8/2018 | Kneuper | B64D 47/08 |
| 2018/0281990 | A1* | 10/2018 | Fagan | H04L 67/75 |
| 2019/0051038 | A1 | 2/2019 | Welnowski et al. | |

FOREIGN PATENT DOCUMENTS

| | | | |
|---|---|---|---|
| WO | 0052550 | A2 | 9/2000 |
| WO | 2017089858 | A1 | 6/2017 |
| WO | 2017089861 | A1 | 6/2017 |
| WO | WO-2017089862 | A1 * | 6/2017 ............ B64D 11/00 |
| WO | 2017141228 | A1 | 8/2017 |

* cited by examiner

HYPERCONTEXTUAL TOUCH-THE-PLANE (TTP) CABIN MANAGEMENT GRAPHICAL USER INTERFACE (GUI)

TECHNICAL FIELD

Embodiments of the inventive concepts disclosed herein are directed generally to cabin management systems and more particularly to graphical user interfaces (GUI) providing for passenger and crew control of cabin functions.

BACKGROUND

Cabin management systems (CMS) provide passengers with convenient access to cabin controls (e.g., cabin lighting and climate settings, window shade controls) while providing the cabin crew with set-up and maintenance functionality as well as the capability to monitor passenger attendant calls inflight. Conventional cabin management system controls may include a graphical user interface (GUI) and are generally hierarchical and textual menu-based systems. These menu-based hierarchies may be difficult for passengers to navigate and may involve the traversing of complex submenu structures to activate controls or change parameters. Customization of the GUI at a customer's request may result in extensive reconfiguration of the navigation system to accommodate a desired hierarchy. Further, as the textual menu systems tend to be designed for English-language functionality, multiple large translation files must be created and maintained over the life of the GUI (one for each additional language). If the translated languages do not fit the spaces allotted for their English equivalents, further reconfiguration of the GUI may be necessary.

SUMMARY

A cabin management control device is disclosed. In embodiments, the cabin management control device includes a computing device incorporating a touchscreen (e.g., either a fixed panel or a portable/mobile computing device) and processors. The computing device is in wired or wireless communication with aircraft-based networks or control devices configured for control of cabin features or functions. The computing device displays, via the touchscreen, an interactive graphical user interface (GUI) in the form of a high resolution "virtual cabin", e.g., graphical representation of the aircraft cabin or a particular zone thereof. The GUI incorporates active touch areas (ATA) corresponding to cabin features visible within the virtual cabin and portrayed therein (e.g., cabin lighting or inflight entertainment systems (IFE)). For example, when a particular ATA is selected by a user, the GUI displays a textless control interface enabling the user to adjust or control the corresponding feature (e.g., lighting settings, entertainment selections) via a universally intuitive interface based on icons and symbols as opposed to text. Similarly, the GUI displays direct access controls (DAC) allowing for similar control of cabin features not clearly visible within the virtual cabin (e.g., volume settings, climate settings), displaying an intuitive textless control interface for control of the corresponding feature when a particular DAC is selected.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
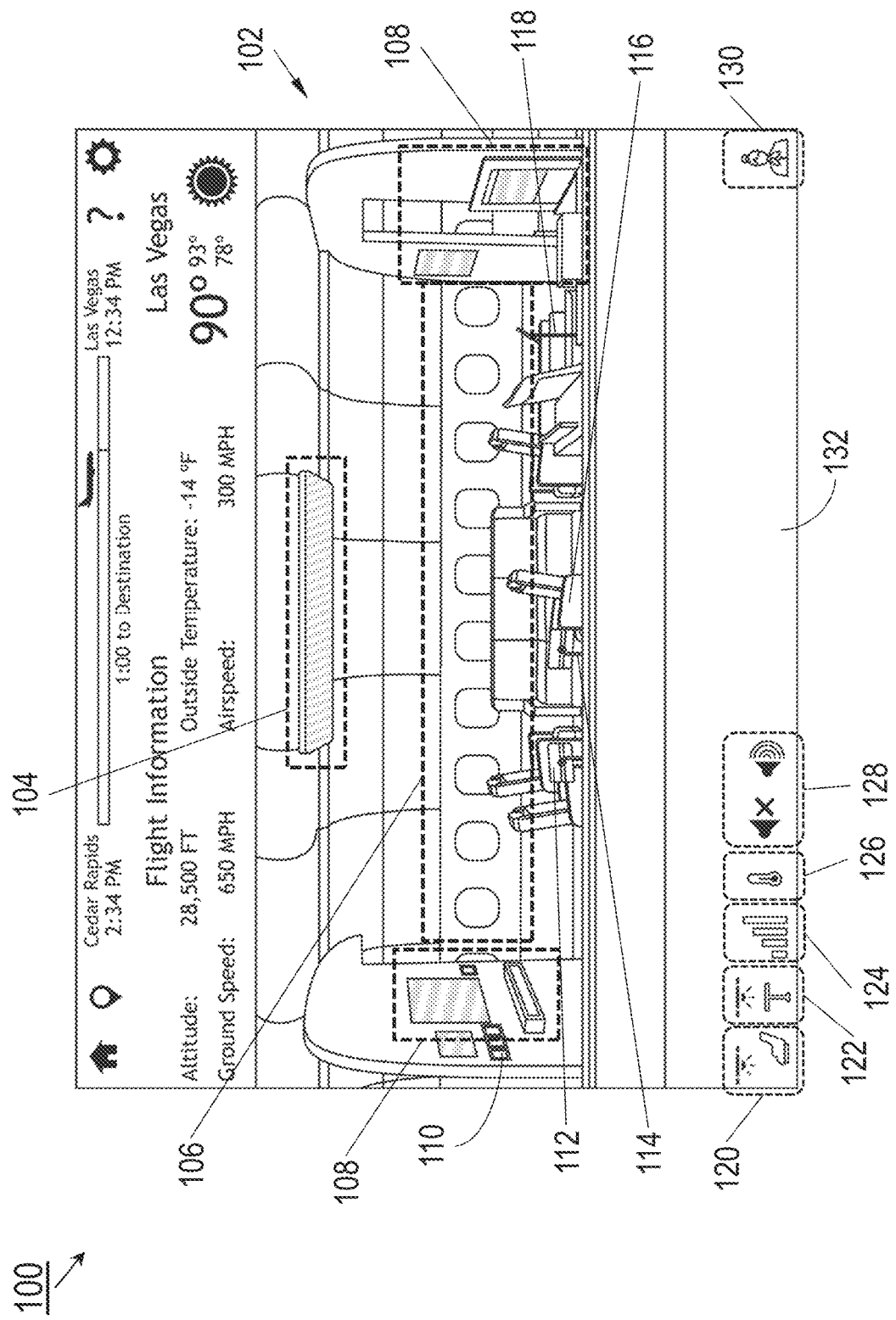
FIG. 1 is an illustration of a graphical user interface (GUI) in accordance with example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to a hypercontextual iconographic graphical user interface (GUI) providing intuitive access and guidance to passengers and crew for adjustment and control of various cabin functionalities and features. The GUI improves on textual-based hierarchical menu systems by minimizing the use of menus and words in favor of a universally intuitive user interface. Instead, the GUI provides a realistic virtual representation of the ambient cabin environment, with touch-sensitive "touch the plane" (TTP) graphical controls for cabin features corresponding to their locations within the "virtual world".

Referring to FIG. 1, a graphical user interface (GUI) 100 is disclosed. The GUI 100 may correspond to a graphical representation of a Layout of Passenger Accommodations (LOPA), e.g., a graphical representation of an aircraft cabin or of a particular cabin zone 102 therewithin. The graphical representation displayed by the GUI 100 may portray active touch areas (ATA) corresponding to visible features within the cabin zone 102, e.g., cabin lighting 104, windows 106, and inflight entertainment (IFE) systems 108.

In embodiments, the GUI 100 may be displayed on any computing device including a touchscreen (i.e., a touch-sensitive display surface capable of accepting directed control input provided by a user by making contact with a particular location relative to the display surface, e.g., by tapping, pressing for an extended length of time, or directing a finger or stylus along the surface of the screen in a predetermined path) and in communication with networks or controller devices/systems aboard the aircraft. For example, the GUI 100 may be displayed on an interactive panel 110 mounted to a wall, monument, or class divider within the aircraft cabin. Similarly, the GUI 100 may be displayed on a mobile computing device (e.g., a tablet 112, as shown by the GUI). For example, users (e.g., passengers and crew-members) may bring a compatible mobile computing device aboard the aircraft and "log in" to the GUI 100, enabling the users to view the GUI and control cabin functions through the touchscreen of the mobile device. In some embodiments, the tablet 112 may connect wirelessly to aircraft-based networks (e.g., via Wi-Fi, Bluetooth, or any appropriate wireless communication protocols) allowing connectivity and remote control of the cabin lighting 104, windows 106, IFE systems 108, and other cabin features. In some embodiments, the tablet may be physically connected to aircraft networks and cabin features via Ethernet connection (or any appropriate avionics networking connection). For example, the tablet 112 may be mounted in a cradle 114 configured to secure the device proximate to the user (e.g., proximate to a passenger seat 116 occupied by the user) and providing an Ethernet interface via which the tablet may be physically connected to the network/s.

In embodiments, the GUI 100 may display a two-dimensional (2D) graphical representation of the passenger cabin or cabin zone 102. In some embodiments, the GUI 100 may include a three-dimensional (3D) graphical representation capable of shifting perspective in response to position or orientation changes as detected by inertial sensors onboard the tablet 112 (e.g., accelerometers) or in response to control input submitted by the touchscreen (e.g., zooming in or out relative to a particular cabin feature). The graphical representation may be customized to match a particular aircraft interior, allowing for a degree of customer customization and personalization without restructuring or reconfiguration of the GUI 100.

In embodiments, the GUI 100 may incorporate direct access controls (DAC) displayed proximate to the graphical representation, each DAC allowing the user to access or control a cabin feature not visible within the graphical representation. For example, certain cabin features may be visible within the "virtual cabin", but it may not be desirable for these features to be controllable via an ATA. Reading lights mounted in the cabin ceiling may be oriented toward a particular seat but may be too small relative to the passenger cabin to constitute an appropriately sized ATA. Alternatively, it may not be desirable for an occupant of a particular passenger seat 116 to control reading lights (or table lights 118) oriented toward other seats within the cabin. Accordingly, the GUI 100 may include one or more DACs positioned proximate to, but outside, the graphical representation or "virtual cabin", each DAC represented by an icon and capable of controlling a corresponding feature when selected (e.g., overhead reading lights 120, table lights 122, network connectivity 124, cabin climate settings 126, speaker/earpiece volume 128 (e.g., including a mute setting), flight attendant call status 130). In some embodiments, the DACs 120-130 may be grouped into a direct access control bar 132 (DAC bar) proximate to the "virtual cabin".

In embodiments, the graphical representation or virtual cabin displayed by the GUI 100 includes minimal or no text; rather, the GUI 100 may display icon- or symbol-based controls designed to be non-hierarchical and optimally intuitive across a broad variety of linguistic, cultural, or national backgrounds. For example, when a particular ATA is selected (e.g., by contact with the touchscreen), the GUI 100 may superimpose over the virtual cabin a textless control interface corresponding to, e.g., cabin lighting 104, cabin windows 106, IFE systems 108, or any other appropriate cabin feature controllable by the GUI.

Figure 2:
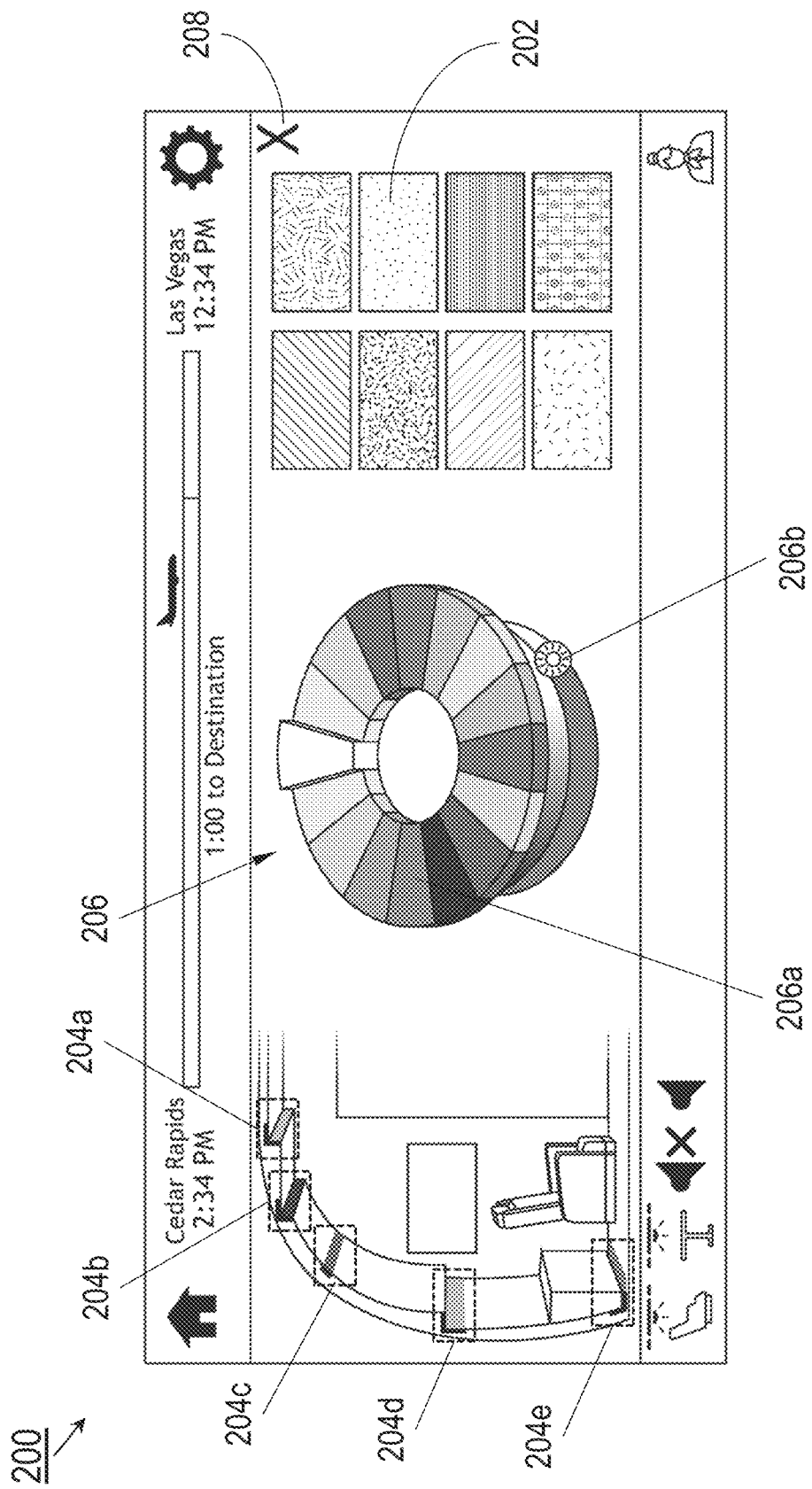
FIGS. 2 and 3 are illustrations of feature controls of the GUI of FIG. 1.

Referring to FIG. 2, the textless control interface 200 may be displayed by the GUI 100 (FIG. 1) when the user selects the cabin lighting ATA 104 (FIG. 1; e.g., by tapping or touching).

In embodiments, the textless control interface 200 may include a dialog box superimposed over the graphical representation shown by FIG. 1. The textless control interface 200 may provide the user with controls for a variety of lighting or display elements throughout the cabin. For example, as shown by FIG. 1, the cabin lighting ATA 104 may correspond to an overhead lighting/display panel. The textless control interface 200 may allow the user to select from a variety of pre-programmed display patterns 202 for display by the overhead lighting and display panel.

In embodiments, the textless control interface 200 may allow a user to select from other lighting elements within the aircraft cabin, e.g., overhead wash lighting 204a-c, wash lighting 204d proximate to the aircraft windows, and track lighting 204e proximate to the aircraft floor. For each selected lighting element 204-e, the textless control interface 200 may display intuitive lighting controls 206 allowing for precise adjustment of the spectral content (206a) and/or luminous intensity (206b) of each individual lighting element or bank thereof. The user may close out (208) the textless control interface 200 to return to the virtual cabin shown by FIG. 1.

Figure 3:
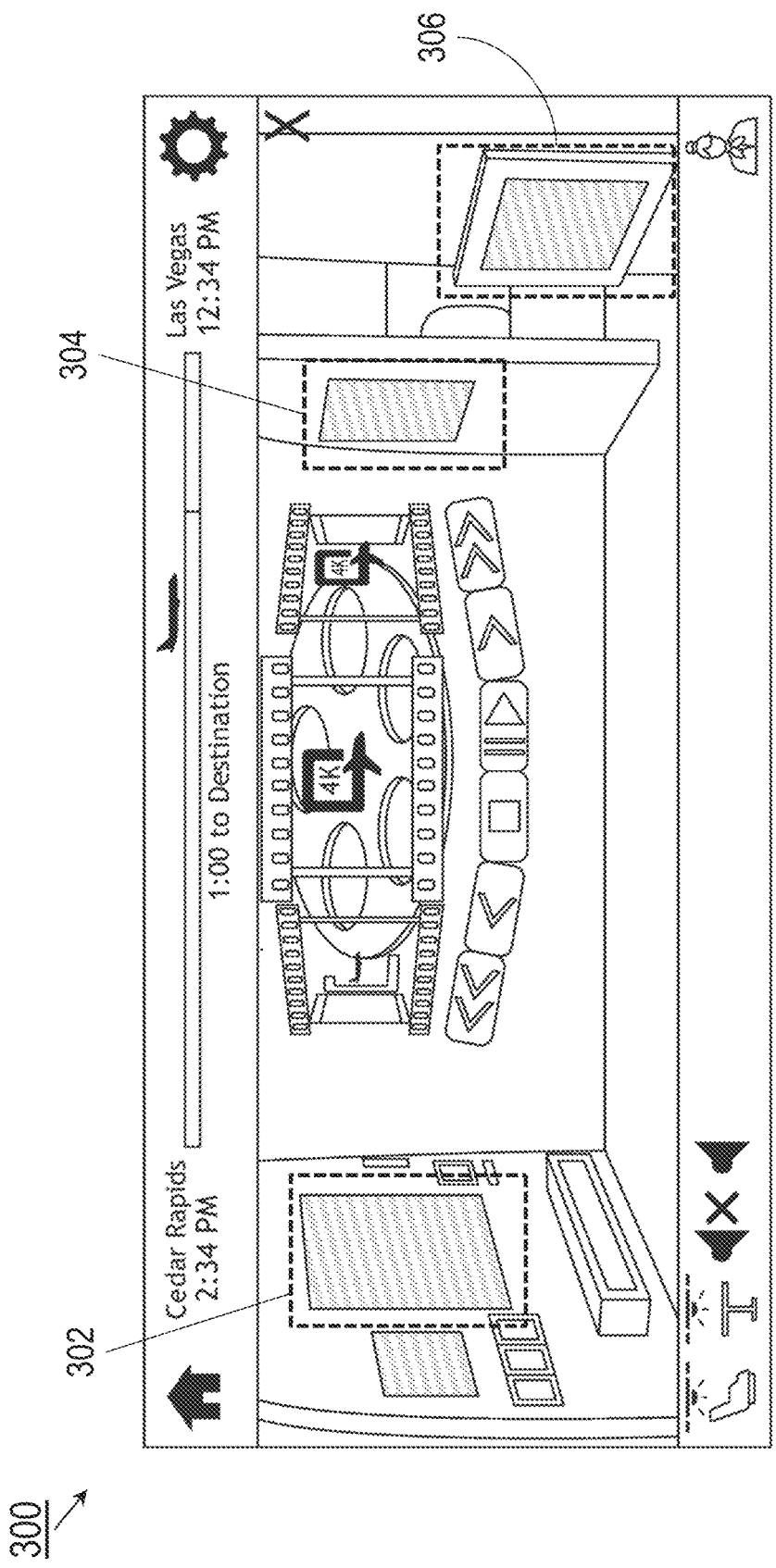

Referring to FIG. 3, the textless control interface 300 may be displayed by the GUI 100 (FIG. 1) when the user selects an inflight entertainment (IFE) ATA 108 (FIG. 1).

In embodiments, the textless control interface 300 may include a superimposed dialog box similar to the textless control interface 200 shown by FIG. 2. For example, the textless control interface 300 may allow the user to select (e.g., via their graphical representations 302, 304, 306) one of multiple IFE units (e.g., a monitor mounted within a cabin or cabin zone (102, FIG. 1) or proximate to a passenger seat (116, FIG. 1); an audio channel in communication with a speaker or headphone port) and control, via an intuitive graphic-based control, content displayed on a particular IFE unit (e.g., content selection, volume, playback speed, etc.)

Similarly to the textless control interfaces 200, 300 (FIGS. 2-3), the GUI 100 may display superimposed textless control interfaces when other ATAs are selected by the user. For example, selection of the cabin windows ATA 106 (FIG. 1) may result in the display of a textless control interface to control the deployment of shades over one or more cabin windows, e.g., via mechanical raising or lowering of window shades or electrochromic tinting of the window panels.

Figure 4:
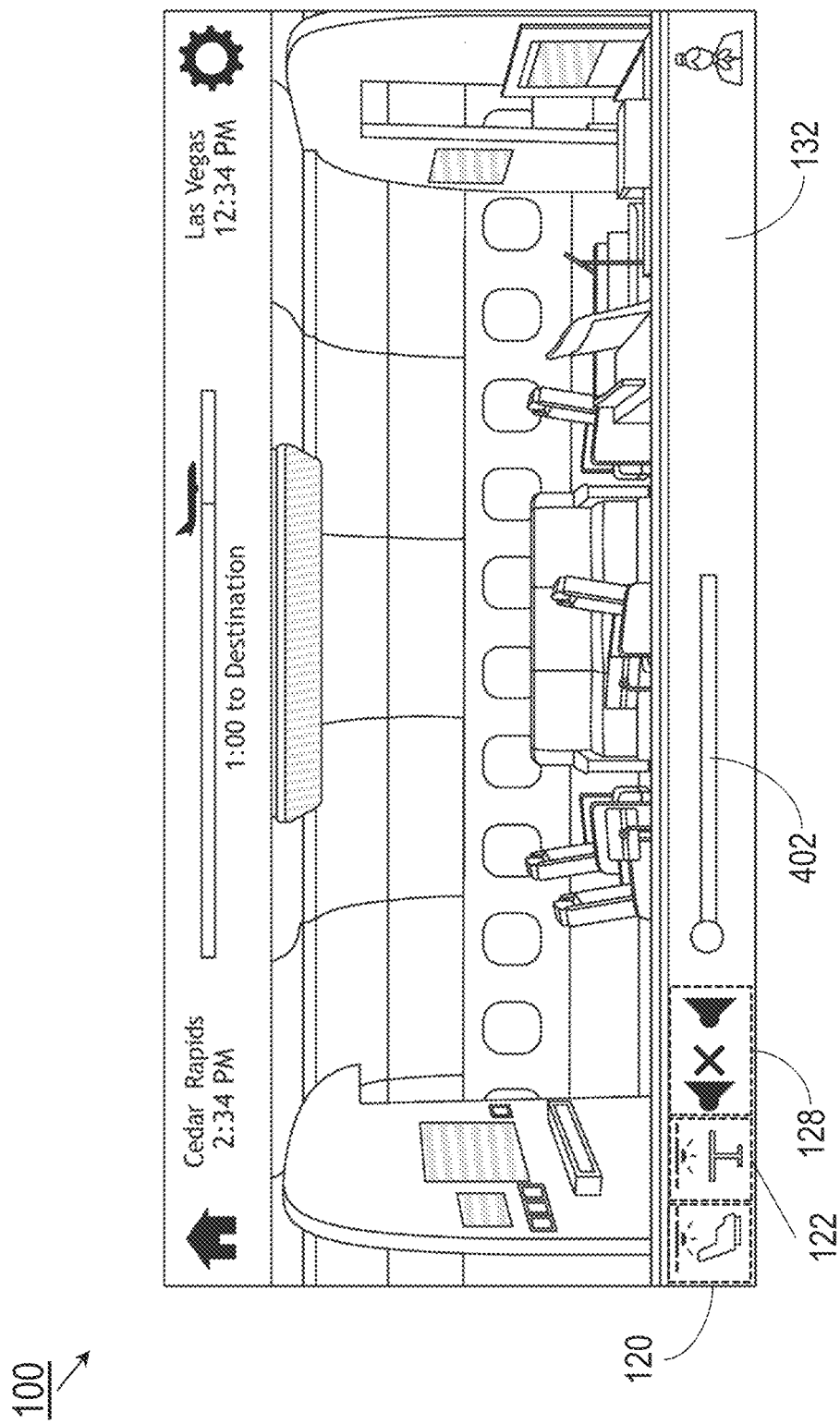
FIG. 4 is an illustration of a direct access control (DAC) of the GUI of FIG. 1.

Referring to FIG. 4, the GUI 100 may display, when a particular DAC is selected by the user, a textless control interface providing for remote control of a particular non-visible cabin feature without the superimposed textless control interfaces 200, 300 (FIGS. 2-3) associated with ATAs 104, 106, 108 (FIG. 1).

In embodiments, selection of a particular DAC may generate a textless control interface within the DAC bar 132. For example, selection of the volume control DAC 128 may spawn a volume slider 402 within the DAC bar so that volume levels may be adjusted via the GUI 100. Similarly, the reading light and table light DACs 120, 122 may indicate whether the corresponding lights are currently in an active (on) or inactive (off) state.

Figure 5:
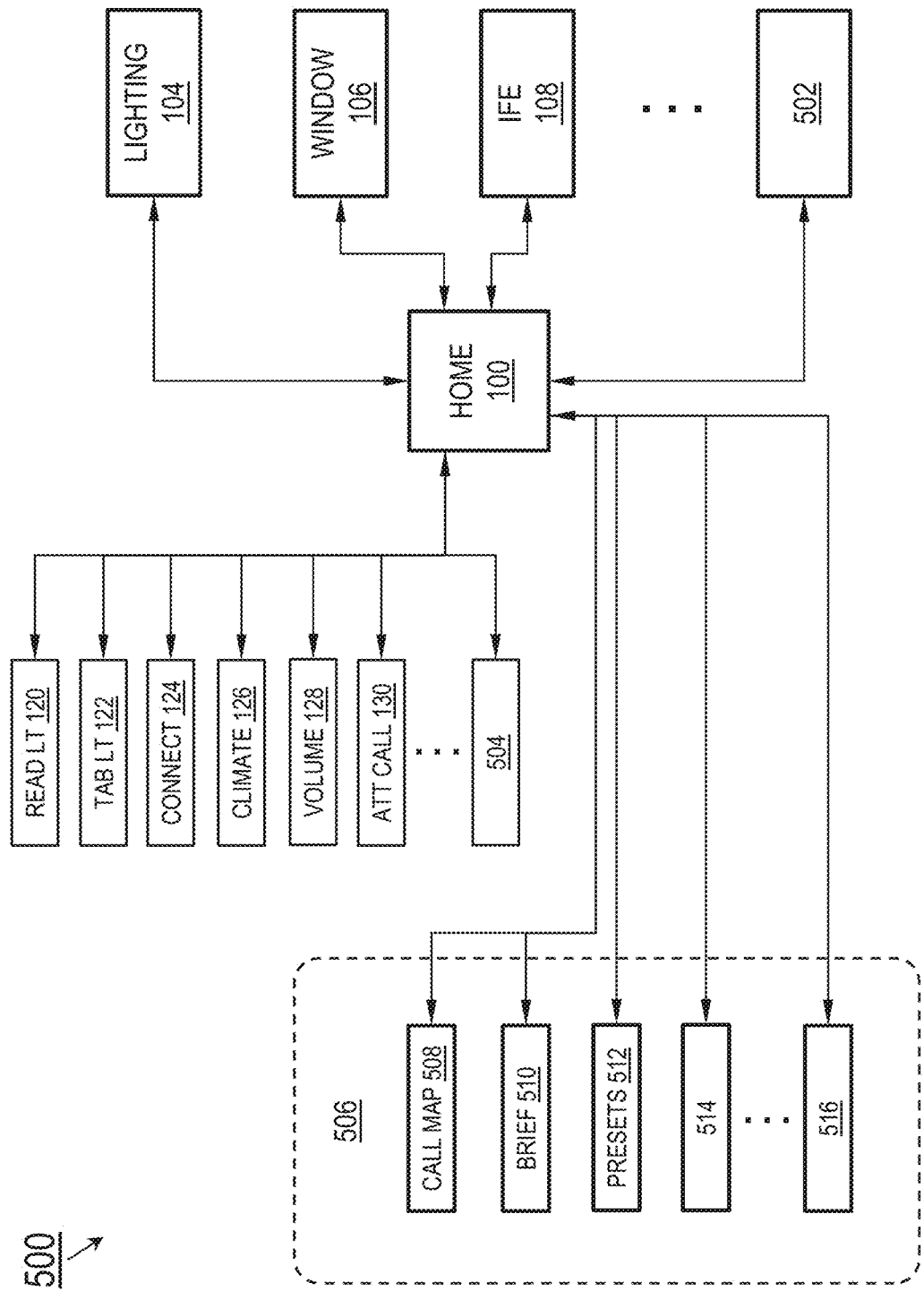
FIG. 5 is a diagrammatic illustration of control structures of the GUI of FIG. 1.

Referring to FIG. 5, a control hierarchy 500 of the GUI 100 is shown. In embodiments, the GUI 100 may include, as previously noted, ATAs corresponding to visible cabin features, e.g., cabin lighting 104, cabin windows 106, inflight entertainment 108, and other additional ATAs (502) depending, e.g., on customer needs or on the aircraft configuration. Similarly, the GUI 100 may include DACs corresponding to nonvisible cabin features, e.g., reading lights 120, table lights 122, connectivity settings 124, climate settings 126, volume settings 128, cabin attendant call settings 130, and other additional DACs (504) as needed or desired.

In embodiments, the ATAs 102-106, 502 and DACs 120-130, 504 may be fully accessible to any passenger or crewmember, e.g., via a wall panel located within a passenger cabin zone (102, FIG. 1) or via a tablet (112, FIG. 1) or other mobile device. The GUI 100 may include additional restricted ATAs and DACs (506) accessible only to certain user classes (e.g., crewmembers, first class/VIP passengers) but inaccessible to other user classes (e.g., economy-class passengers). For example, cabin crewmembers may additionally access, via the GUI 100, restricted textless control interfaces, e.g., attendant call maps 508 indicating the status of pending cabin attendant calls and responses thereto; safety briefings 510; cabin presets 512 corresponding to pre-set parameters for cabin features otherwise adjustable by passengers via the GUI 100; maintenance functions 514; and other additional restricted textless control interfaces 516.

Figure 6:
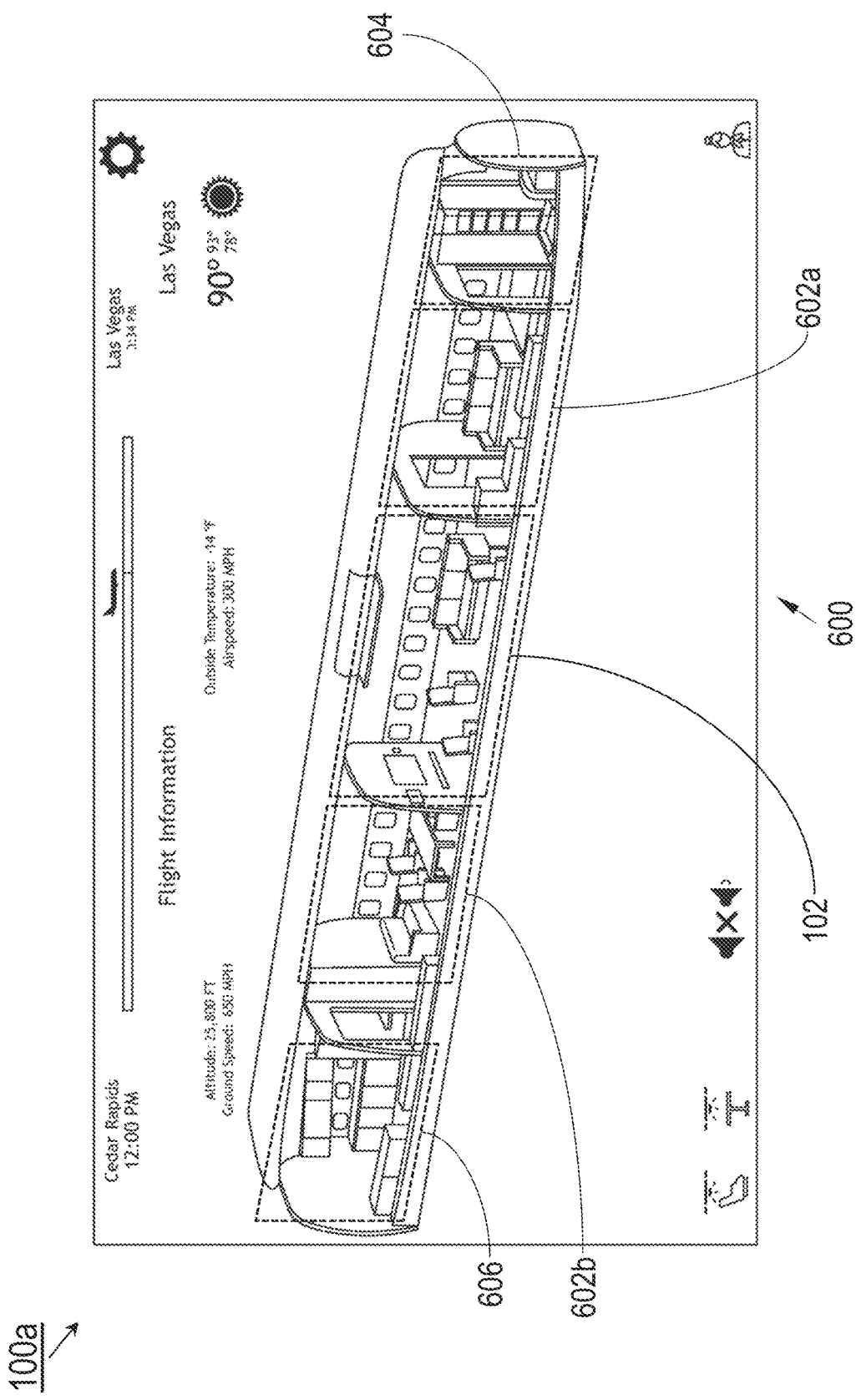
FIG. 6 is an illustration of the GUI of FIG. 1.

Referring to FIG. 6, the GUI 100a may be implemented and may function similarly to the GUI 100 of FIGS. 1-5, except that the GUI 100a may display an expanded graphic representation of an aircraft 600 including, but not limited to, the cabin zone 102.

In embodiments, the GUI 100a may provide ATAs corresponding to multiple cabin zones in addition to the cabin zone 102, e.g., passenger cabin zones 602a-b, entry/forward lavatory area 604, and aft galley area 606. By tapping or touching an ATA corresponding to a particular cabin zone, the user may cause the GUI 100a to display a graphical representation of the selected zone (e.g., the cabin zone 102 as shown by FIGS. 1 and 4), with appropriate ATAs and DACs for control of any cabin features located therein.

Figure 7:
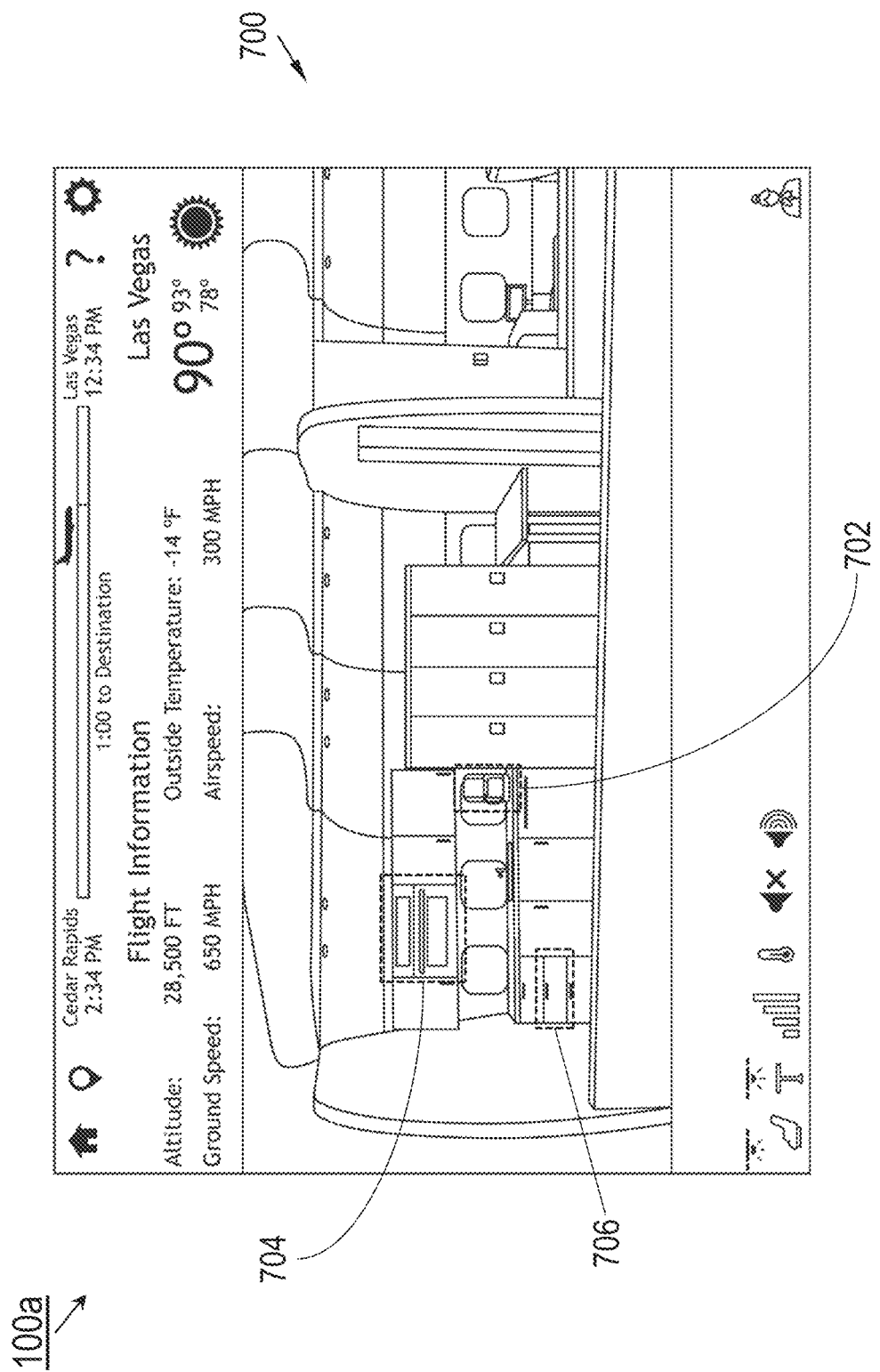
FIG. 7 is an illustration of zone specific controls of the GUI of FIG. 1.

Referring to FIG. 7, the GUI 100a may display a graphical representation 700 corresponding to the aft galley area upon selection of the aft galley area ATA 606 within the expanded graphic representation of the aircraft 600 as shown by FIG. 6.

In embodiments, the graphical representation 700 may be implemented and may function similarly to the GUIs 100, 100a of FIGS. 1-6, except that the graphical representation 700 of the aft galley area may include ATAs or DACs corresponding to galley insert (GAIN) devices, e.g., air chillers (for regulating the temperature of galley cart bays), beverage makers 702 (e.g., coffeemakers, tea brewers), ovens 704 (e.g., conventional, convection, microwave), or temperature-controlled food storage compartments 706 (e.g., chiller or warmer compartments). By selecting a particular ATA or DAC, the user (e.g., a cabin crewmember) may cause the GUI 100a to display a textless control interface allowing the user to adjust or control the performance of the corresponding GAIN, e.g., by checking or adjusting the interior temperature of a chiller compartment (706).

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A cabin management control device, comprising:
a computing device comprising a touchscreen, the computing device including at least one processor and in communication with at least one of an aircraft network and a cabin controller, the computing device configured to display via the touchscreen at least one graphical user interface (GUI) corresponding to a three-dimensional (3D) virtual cabin of an aircraft, the virtual cabin including a shifting perspective that changes in response to at least one of a position change of the computing device and an orientation change of the computing device, the GUI comprising:

at least one active touch area (ATA) corresponding to a portion of the virtual cabin and to a visible cabin feature visible within the virtual cabin, the computing device configured to display a first fully textless control interface superimposed over the virtual cabin when contact is made with the ATA by a user via the touchscreen, the first fully textless control interface capable of controlling at least one visible parameter corresponding to the visible cabin feature based on control input provided by the user via the touchscreen, wherein the visible parameter includes at least one of a cabin lighting status, a window status, or in-flight entertainment (IFE) status; and at least one direct access control (DAC) corresponding to a nonvisible cabin feature not visible within the virtual cabin, the computing device configured to display a second fully textless control interface that employs symbols and icons for control when the DAC is selected by the user via the touchscreen, the second textless control interface capable of controlling at least one nonvisible parameter corresponding to the nonvisible cabin feature based on control input provided by the user via the touchscreen, wherein the nonvisible parameter includes at least one of a cabin climate setting, a volume setting, or a connectivity setting, wherein the first fully textless control interface and the second fully textless control interface are symbol-based and without text corresponding to the at least one visible parameter or the at least one nonvisible parameter, respectively;

wherein the GUI includes at least one of at least one additional restricted ATA or at least one additional DAC accessible only to a first user class and inaccessible to a second user class, the first user class comprising one or more crewmembers and the second user class comprising one or more passengers; and wherein the virtual cabin includes a three-dimensional (3D) virtual cabin capable of shifting a perspective of the virtual cabin in response to at least one of a position change of the computing device and an orientation change of the computing device.

2. The cabin management control device of claim 1, wherein the computing device is mounted within an aircraft cabin.

3. The cabin management control device of claim 2, wherein:
the computing device is mounted proximate to a passenger seat; and
the user includes an occupant of the passenger seat.

4. The cabin management control device of claim 3, wherein:
the at least one second textless control interface includes at least one textless control interface corresponding to the passenger seat.

5. The cabin management control device of claim 1, wherein the computing device includes a mobile computing device.

6. The cabin management control device of claim 5, wherein the mobile computing device is wirelessly coupled to the aircraft network and the cabin controller.

7. The cabin management control device of claim 5, wherein the mobile computing device is physically coupled to the aircraft network and the cabin controller.

8. The cabin management control device of claim 1, wherein:
an aircraft cabin includes a passenger cabin;
the at least one visible parameter corresponds to at least one of a cabin lighting status, a window status, or an in-flight entertainment (IFE) status; and
the at least one nonvisible parameter corresponds to at least one of a cabin climate setting, a volume setting, or a connectivity setting.

9. The cabin management control device of claim 1, wherein at least one user class includes at least one of a crewmember class, a passenger class, or an enhanced passenger class.

10. The cabin management control device of claim 1, wherein:
a second textless control interface displayed when the at least one additional DAC is selected includes a passenger seat map corresponding to a plurality of passenger seats within an aircraft cabin; and
the at least one nonvisible parameter includes at least one of 1) a seat status associated with the plurality of passenger seats or 2) a passenger status corresponding to an occupant of the plurality of passenger seats.

11. The cabin management control device of claim 1, wherein:
a second textless control interface displayed when the at least one additional DAC is selected includes at least one of:
a plurality of safety briefings;
a plurality of cabin presets;
or
a plurality of maintenance functions.

12. The cabin management control device of claim 1, wherein:
the virtual cabin of the aircraft includes an aircraft galley;
the at least one additional ATA and the at least one additional DAC corresponds to a galley insert (GAIN) device; and
at least one of the at least one visible parameter and the at least one nonvisible parameter corresponds to a setting of the GAIN device.

13. The cabin management control device of claim 12, wherein the GAIN device includes at least one of an air chiller, a beverage maker, an oven, or a chiller compartment.

* * * * *